Sept. 6, 1966     T. RADOSEVIC, JR     3,270,440

SEAT FOR FLIGHT MOTION SIMULATOR

Filed Feb. 8, 1963     2 Sheets-Sheet 1

INVENTOR.
THEODORE RADOSEVIC, JR.

BY

ATTORNEY

*INVENTOR.*
THEODORE RADOSEVIC JR.
BY
*ATTORNEY*

United States Patent Office 3,270,440
Patented Sept. 6, 1966

3,270,440
SEAT FOR FLIGHT MOTION SIMULATOR
Theodore Radosevic, Jr., North Canton, Ohio, assignor to Goodyear Aerospace Corporation, Akron, Ohio, a corporation of Delaware
Filed Feb. 8, 1963, Ser. No. 257,204
1 Claim. (Cl. 35—12)

This invention relates to flight simulators for pilot training and in particular to a seat for simulating the feel of motion of an aircraft in response to movement of controls by the pilot.

It is the general object of this invention to provide a seat in a flight simulator cockpit adjacent a conventional combination of control members so designed that by manipulation of the controls a corresponding feeling of motion will be imparted to the seat to give the feel of "seat of the pants" flying.

It is a further object of the invention to provide a stationary cockpit seat which will simulate the motion of a moving cockpit seat.

A still further object of the invention is to simulate maneuvers affecting pilot acceleration, such as long term coordinated or uncoordinated turns, "pull-outs," "push-overs" and deceleration effects simulating a landing approach.

Another object of the invention is to eliminate the dead feel of an absolutely stable platform during level flight by inducing slight motions which can be felt by the pilot.

Still another object of the invention is to simulate cockpit motions such as buffeting and small displacement vibrations which would be present during aerodynamic motions of the cockpit.

These and other objects of the invention which will become apparent as the description proceeds are achieved by providing a pilot's seat with adjacent controls similar to those in an aircraft. The seat has inflatable cushions divided into a plurality of air cells. When the pilot moves the stick, rudder and other controls, electrical signals are sent to a computer which converts the signals into a plurality of out-put signals, each of which passes through a summation amplifier and demodulator to operate a servo valve. The servo valve operates a hydraulic actuator which in turn operates an air cylinder. Each air cylinder is connected by a conduit to one of the air cells in the seat cushion whereby actuation of each air cylinder increases or decreases the pressure in its respective air cell in the cushion. By moving the controls to simulate various maneuvers such as turns, pull-outs, etc., the pressure in each of the different air cells of the seat cushions is varied to produce uneven pressure on different parts of the pilot's body to give a simulated feeling of the motion of the aircraft which would be experienced in performing the various maneuvers.

For a better understanding of the invention reference should be had to the accompanying drawings, wherein.

Figure 1:
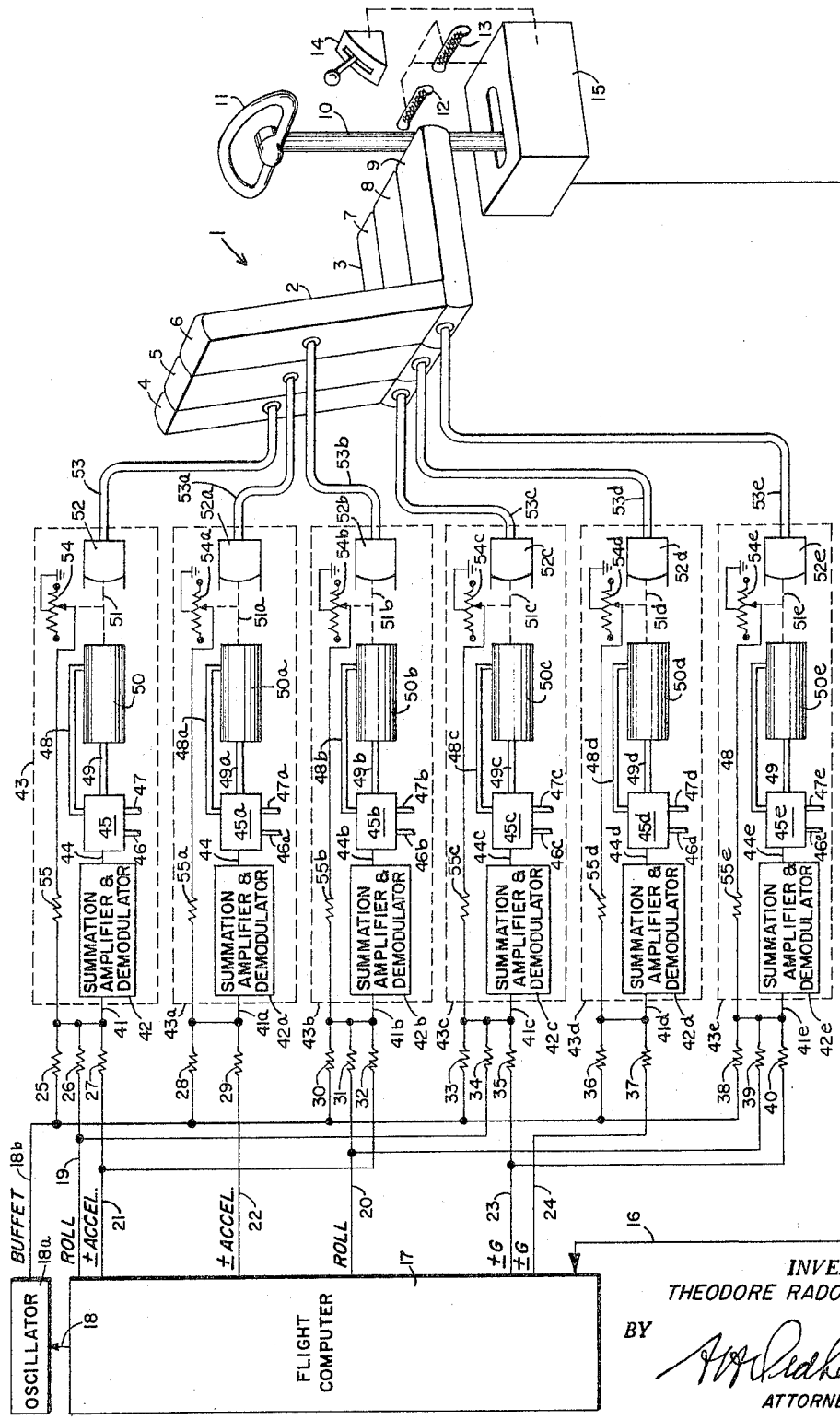
FIG. 1 is a schematic diagram showing the inflatable seat of the invention with pneumatic means operated by electromechanical control means in turn actuated by computer outputs.

With specific reference to FIG. 1 of the drawings, the numeral 1 indicates generally a pilot's seat having a back cushion 2 and a bottom cushion 3. The cushion 2 is divided into a left cell 4, a center cell 5, and a right cell 6. The bottom cushion 3 is divided into a left cell 7, a center cell 8, and a right cell 9. All the cells of the seat cushions are individually connected to inflation and deflation means as will be described later in this specification.

Adjacent the pilot's seat are the controls which include a stick 10 having a wheel 11 rotatably mounted on its upper end, a left rudder pedal 12, a right rudder pedal 13 and a throttle 14. All the controls are mechanically connected to a converter 15 which houses conventional means such as potentiometers or the like which are well known in the flight simulator art for converting the movement of the controls into electrical signals which pass through a group of computer inputs collectively represented by a single line 16 to a conventional flight computer 17.

The flight computer 17 has many inputs and outputs in addition to the ones disclosed in this application since the computer actually controls all the flight simulator operations such as providing instrument panel control signals, sound simulation, and visual displays if used in the simulator. For simplicity, the inputs and outputs which do not form a part of this invention have been omitted.

The flight computer per se is not a part of this invention and may, for example, be of the type disclosed in Dehmel Patent 2,842,867, granted July 15, 1958, for "Flight Computing System and Apparatus." It will be obvious that other types of computers resulting from advances in the art may be adapted to perform the same operations and the computer may be of the A.C. or D.C. type and may be an analog or digital computer. There appears to be some advantages of an A.C. computer over a D.C. computer with respect to cost, size, maintenance, and power consumed. For the purpose of illustrating the invention, the computer 17 will be considered to be an A.C. analog computer.

The computer 17, has outputs 18, 19, 20, 21, 22, 23 and 24 respectively representing the functions marked on the drawings of buffet, roll, roll, ±acceleration, ±acceleration, ±G, and ±G. The computer outputs are connected through resistors numbered 25 through 40 in a particular arrangement, which will be described later, to inputs 41, 41a, 41b, 41c, 41d and 41e to summation amplifier and demodulators 42, 42a, 42b, 42c, 42d and 42e respectively. The computer output 18 is not connected directly through resistors to input 41 but is connected to a conventional A.C. oscillator 18a which has an output 18b that connects through resistors to all the amplifier inputs 41, 41a, 41b, 41c, 41d and 41e. When used with the present A.C. computer, each summation amplifier and demodulator consists of conventional components, specifically an operational summing amplifier, and a demodulator. When used with a D.C. computer only a summation amplifier is required. A demodulator is only required when using an A.C. computer to convert the A.C. voltage to D.C.

To shorten the description, all the summation amplifier and demodulators will be referred to hereafter as amplifiers. The computer buffet output 18 is connected to a conventional A.C. oscillator 18a which provides output pulses at an output 18b which is connected through resistor 25 to input 41 of amplifier 42, through resistor 28 to input 41a of amplifier 42a, through resistor 30 to input 41b of amplifier 42b, through resistor 33 to input 41c of amplifier 42c, through resistor 36 to input 41d of amplifier 42d, and through resistor 38 to input 41e of amplifier 42e.

The computer roll output 19 is connected through resistor 26 to input 41, of amplifier 42, and through resistor 34 to input 41c, of amplifier 42c.

The roll computer output 20 is connected through resistor 31 to input 41b of amplifier 42b, and through resistor 39 to input 41e of amplifier 42e.

The computer ± acceleration output 21 is connected through resistor 27 to input 41 of amplifier 42, and through resistor 32 to input 41b of amplifier 42b.

The computer ± acceleration output 22 is connected through resistor 29 to input 41a of amplifier 42a. The computer ±G output 23 is connected through resistor 35 to input 41c of amplifier 42c and through resistor 40 to input 41e of amplifier 42e. The computer ±G output 24 is connected through resistor 37 to input 41d of amplifier 42d.

Thus it may be seen that a plurality of computer outputs are connected to the input of each summing amplifier and demodulator which sums and amplifies the voltages from the computer outputs to form an output voltage from each summation amplifier which drives a servo valve.

As may be seen in FIG. 1, the summation amplifiers 42, 42a, 42b, 42c, 42d, and 42e form part of identical actuator systems 43, 43a, 43b, 43c, 43d, and 43e respectively. Each actuator system is represented by a block in dotted lines. Actuator system 43 contains, in addition to the summation amplifier 42, summation amplifier output 44 which transmits voltage to drive a servo valve 45. The servo valve 45 has hydraulic pressure supply lines 46 and 47 which are connected to a hydraulic pressure source not shown. The valve 45 controls the amount of hydraulic pressure exerted through hydraulic lines 48 and 49 to operate a hydraulic actuator 50. The actuator 50 moves piston rod 51 to operate an air cylinder 52 which supplies varied air pressure through air line 53 to the cell 4 of the pilot's seat 1. A potentiometer 54 is mechanically linked to the piston rod 51 to monitor its longitudinal movement and provide a feedback voltage through a resistor 55 to the input 41 of the amplifier 42. The potentiometer 54 has a grounded center tap and is connected to an A.C. voltage source having 0° phase angle at one terminal and 180° phase angle at the other terminal. When the feedback voltage from the potentiometer is of the same magnitude but of opposite polarity from the summed voltage of the computer outputs connected to the input 41, then the two voltages of opposite polarity cancel each other and there is 0 voltage at input 41. When this condition exists the valve and actuator system holds its existing position thereby maintaining a constant air pressure in the air cell 4. As soon as any of the output voltages from the computer change, an error voltage is created at the input 41 of the amplifier 42 and the actuator system operates to increase or decrease the pressure in the cell 4 of the pilot's seat until a position of the piston rod 51 is reached which moves the potentiometer 54 to a point where the feedback voltage from the potentiometer will cancel out any error voltage at the amplifier input 41.

Since actuator system 43 is identical to each of the actuator systems 43a through 43e, the identical components in each system are identified by similar numerals. For example, the amplifier 42 is identical to each of the amplifiers 42a through 42e, servo valve 45 is identical to valves 45a through 45e, etc. It will be obvious that each actuator system controls the pressure in one individual cell of the pilot's seat. Actuator system 43 controls cell 4, 43a controls cell 5, 43b controls cell 6, 43c controls cell 7, 43d controls cell 8, and 43e controls cell 9.

In operation, when a pilot sitting in the pilot's seat 1, moves any of the controls to effect a particular simulated maneuver, the mechanical movement of the control is converted into electrical signals which pass through computer input 16 to the computer 17. If several of the controls are moved simultaneously the combined electrical signals resulting from the control movement are integrated in the computer 17 to produce a combination of output voltages through outputs 18, 19, 20, 21, 22, 23, and 24 which are combined as previously described to provide input voltages to the summation amplifier of each of the actuator systems 43, 43a, 43b, 43c, 43d, and 43e which in turn cause an increase or decrease in pressure air cells 4, 5, 6, 7, 8, and 9 respectively.

More specifically, if the pilot pulls back on the stick such movement causes inputs to the computer that in combination with input signals from the other controls causes a voltage to appear at outputs 23 and 24. The voltage of the output 23 creates an error voltage at inputs 41c and 41e which operate the actuator systems 43c and 43e to increase the pressure in cells 7 and 9, respectively, of the pilot's seat. Similarly, the voltage from output 24 creates an error voltage at input 41d which in turn operates actuation system 43d to decrease pressure in the seat cell 8. In other words, when the pilot pulls back the stick 10, the system causes an increase in pressure in cells 7 and 9 and a decrease in cell 8 of the seat bottom 3, thereby creating a simulated "G" load pressure upon the pilot similar to that resulting from a pull-out. When the pilot pushes the stick forward to return it to a neutral position then the pressure in the seat bottom 3 returns to its normal pressure. When the pilot moves the throttle 14 to give increased throttle signals to the computer, it causes the computer to release a voltage through outputs 21 and 22. The voltage from output 21 creates an error voltage at inputs 41 and 41b to operate the actuation systems 43 and 43b and increase pressure in seat cells 4 and 6 respectively. The voltage from output 21 creates an error voltage at input 41a to operate the actuation system 43a which decreases the pressure in cell 5 of the pilot's seat 1. The combination of an increase in pressure in the outside seat cells 4 and 6 of pilot's seat 1 and a decrease in pressure in the center cell 5 creates the simulated feeling of forward acceleration. When the throttle is decreased the pressure in the seat back 2 provides a feeling of deceleration. When the pilot desires to make a right turn with some resulting roll to the right he may push on the right rudder pedal 13 while turning the wheel 11 to the right. Either pressure on the right rudder pedal or turning the wheel 11 to the right or a combination of both movements will cause an output voltage at computer output 19 thereby operating actuation systems 43 and 43c causing pressure increase in left seat cells 4 and 7. Simultaneously a voltage at computer output 20 operates actuation systems 43b and 43e causing a pressure decrease in right seat cells 6 and 9. This increased pressure on the pilot's left thigh and the left side of his back and decreased pressure on the pilot's right thigh and on the right side of his back gives the simulated feeling that the aircraft is turning and rolling to the right. By pressing on the left rudder pedal 12 and turning the wheel 11 to the left an output voltage is produced from computer output 20 thereby operating actuation systems 43b and 43e and increasing pressure in right seat cells 6 and 9. Simultaneously a voltage at computer output 19 operates actuation systems 43 and 43c causing a pressure decrease in the left seat cells 4 and 7. This increased pressure on the pilot's right thigh and the right side of his back and decreased pressure on the pilot's left thigh and the left side of his back gives a simulated feeling of a left turn and roll. During a right or left roll simulation the center cells 5 and 8 remain at normal pressure unless reacted upon from another force simulation in combination with the roll such as acceleration or deceleration or ±G force. If the computer 17 indicates that a buffet condition exists, a voltage appears at buffet output 18 which triggers the oscillator 18a. The oscillator 18a produces output pulses of some predetermined frequency and amplitude at the oscillator output 18b. The pulses travel from output 18b through the resistors 25 through 40 to the inputs 41, 41a 41b, 41c, 41d and 41e causing simultaneous operation of the actuator systems 43, 43a, 43b, 43c, 43d and 43e which in turn control the pressure in the seat cells 4, 5, 6, 7, 8, and 9 respectively. Since the voltage produced by the oscillator 18a is a pulsating voltage it causes the seat actuator systems to create a pulsating pressure in all the seat cells which simulates a buffet condition. The intensity of the buffeting sensation is determined by the frequency and amplitude of the oscillator output pulses. Of course, it will be obvious that the other additional control inputs may be fed into the computer 17 and that those illustrated in FIG. 1 are merely shown as the most typical examples of control inputs and it will be understood that any pilot's control which effects the movement of an aircraft or other vehicle and which creates a certain sensation on the body of the pilot or operator of the vehicle may be connected in the manner described to apply localized pressure to various portions of the pilot or operator's seat.

Figure 2:
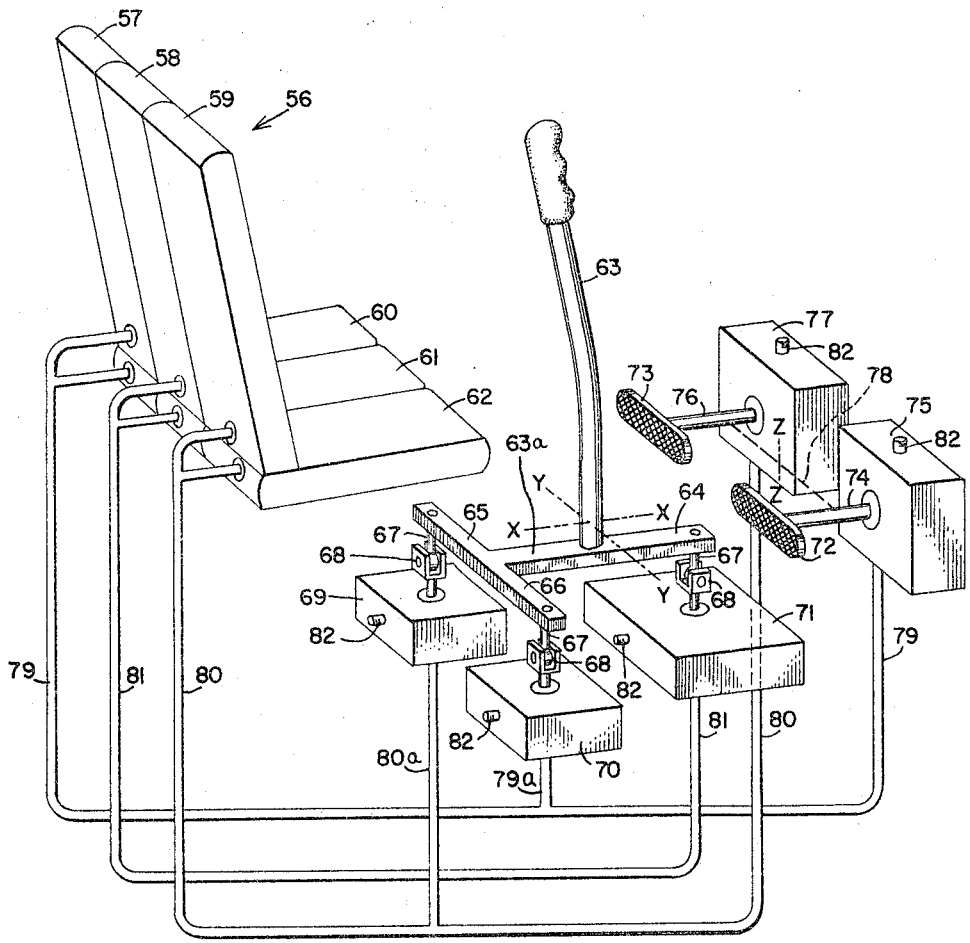
FIG. 2 is a persective diagrammatic view of the invention in which the seat is directly actuated pneumatically.

Referring now to FIG. 2 which shows a pneumatically actuated embodiment of the invention, it may be seen that pressure changes in the seat in response to control movements can be accomplished by connecting the controls by direct mechanical linkages to bellows as air actuators rather than first transmitting the control movements through a computer then through an electromechanical actuation system. Although the pneumatic actuated embodiment may not provide as sensitive and accurate control as the electro-mechanical type there are certain advantages of simplicity and saving of cost, space and weight which may make it desirable to choose the pneumatic system in certain situations. The pneumatic actuated system has a seat 56 similar to seat 1 of FIG. 1.

The seat 56 has cells 57, 58 and 59 on the back of the seat and cells 60, 61, and 62 on the bottom of the seat. Adjacent the seat is a pilot's stick 63 adapted to be moved backward and forward about a Y axis, and left and right about an X axis. A T-shaped frame 63a is rigidly mounted on the lower end of the stick 63. The T-frame 63a has a center leg 64 and two side legs 65 and 66. Each side leg extends in opposite directions from one end of the center leg 64. Rigidly attached to the outside end of each leg of the T-frame is a linkage 67. Each linkage has a pivot 68 which permits the linkage to bend about an axis. The linkage 67 from the leg 65 connects to a bellows 69, the linkage from the leg 66 connects to a bellows 70 and the linkage from the leg 64 connects to a bellows 71. The bellows 69, 70 and 71 provide air pressure to actuate the cells of the seat 56 as will be described later. A right rudder pedal 72 is located on the right side of the stick 63 and a left rudder pedal 73 is located on the left side of the stick 63. The right pedal 72 is connected by a linkage 74 to a bellows 75. The left pedal 73 is connected by a linkage 76 to a bellows 77. The linkage 74 and 76 are pivotly connected to a transverse linkage 78 in such manner that when one pedal is pressed thereby creating increased pressure in the bellows to which it is linked, the other pedal moves out thereby decreasing the pressure in the opposite bellows.

As shown in FIG. 2, the transverse linkage 78 is adapted to pivot about a vertical axis Z when either rudder pedal is pressed. The bellows 75 is connected to the seat cells 57 and 60 by a conduit 79. The bellows 77 is connected to the seat cells 59 and 62 by a conduit 80. The bellows 71 is connected to the seat cells 58 and 61 by a conduit 81. The bellows 69 is connected to a conduit 80a which is connected to the conduit 80 which in turn is connected to the seat cells 59 and 62. Similarly the bellows 70 is connected to a conduit 79a which is connected to the conduit 79 which in turn is connected to the seat cells 57 and 60. Each of the bellows 69, 70, 71, 75, and 77 has a valve 82 for filling the bellows with air.

The operation of the simplified embodiment illustrated in FIG. 2 is overall, similar to that shown in FIG. 1. When the pilot pulls back the stick 63, the T-frame 63a pivots about the Y axis and causes an increase in pressure in the bellows 69 and 70 and a decrease in pressure in the bellows 71. The increase of pressure in the bellows 69 and 70 forces air pressure through conduits 79a, 79, 80a and 80 to increase the pressure in seat cells 57, 59, 60 and 62. Simultaneously the decrease of pressure in the bellows 71 draws air through the conduit 81 from the seat cells 58 and 61 to decrease the pressure in the seat cells 58 and 61. When the pressure is increased in the outer cells 57, 59, 60 and 62 while pressure in the center cells 58 and 61 is decreased, the effect upon the pilot is a simulated feeling of G forces such as are present in a pull-out. When the right rudder pedal 72 is pressed and/or the stick 63 is moved to the right the pressure in the left seat cells 57 and 60 is increased and the pressure in the right cells 59 and 62 is decreased resulting in the simulated feel of a right turn with a roll to the right. When the left rudder pedal 73 is pressed and/or the stick 63 is moved to the left, pressure is increased in the right cells 59 and 62 and decreased in the left cells 57 and 60 giving the simulated feel of a left turn with a roll to the left.

Figure 3:
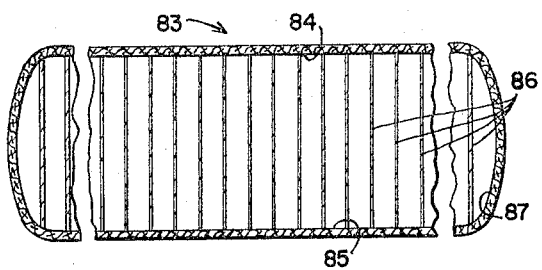
FIG. 3 is a partial cross-sectional view of an "AIR-MAT" type inflatable air cell.

FIG. 3 shows a partial cross-sectional view of a typical cell 83 in the pilot's seat. The cell is composed of a dual wall fabric manufactured by Goodyear Tire & Rubber Company under the trademark "AIRMAT" which is composed of a top impregnated, airtight, flexible fabric wall 84 and a similar bottom fabric wall 85 connected by a plurality of interconnecting drop threads 86 which are interwoven in the fabric walls 84 and 85. The cells in cross section may be rectangular, square or any desired shape when inflated and are enclosed and rendered airtight by flexible side walls 87. These walls 87 take a semi-circular shape at unsupported side edges of each cell, but when cells are connected side to side, as in the seat, the walls 87 act as substantially vertical partitions.

Figure 4:
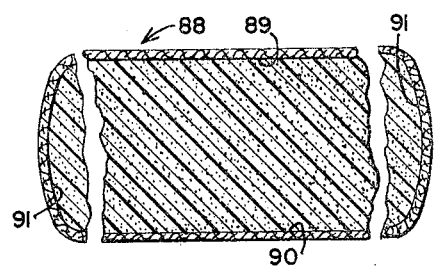
FIG. 4 is a partial cross sectional view of an inflatable air cell filled with resilient foam material.

FIG. 4 shows another modification of a seat cell 88 having a top flexible airtight fabric wall 89, a similar bottom fabric wall 90 and flexible fabric side walls 91. The inside of the seat cell 88 is filled with resilient plastic foam 92. Of course, it will be understood that any cell structure capable of inflation may be used with this invention to form the seat cushions and it will also be understood that the principles of this invention need not be limited to a pilot's seat in an aircraft but by proper arrangement of the seat cells the invention could be used in a simulator for a space vehicle or any other type of vehicle in which the operator's seat imparts certain pressures on the body of the vehicle operator.

It will be recognized that the objects of the invention have been achieved by providing a system which varies the pressure at different portions of a pilot's seat in proportion to the movement of the controls by the pilot to simulate the feel of various maneuvers which may be performed in an aircraft.

While certain representative embodiments and details have been shown for the purpose of illustrating the invention, it will be apparent to those skilled in this art that various changes and modifications may be made therein without departing from the spirit or scope of this invention.

I claim:

In a flight simulator
(1) an inflatable pilot's seat comprising,
   (a) a back cushion having rectangular inflatable air cells vertically arranged in edge to edge abutting relation, and
   (b) a bottom cushion having rectangular inflatable air cells arranged in edge to edge abutting relation and running from front to rear of the seat bottom,
(2) a control stick adjacent the seat capable of left and right movement and fore and aft movement,
(3) a pair of rudder pedals with one pedal on each side of the control stick, (4) a T-frame mounted on the lower end of the control stick,
(5) a plurality of bellows operatively connected to the T-frame to create varying air pressure upon movement of the control stick,
(6) a bellows operatively connected to each rudder pedal to create varying air pressure upon movement of the rudder pedals, and
(7) a conduit from each bellows connected to at least one air cell in the seat to transmit the bellows pressure to the connected air cell thereby providing changes in seat pressure upon the pilot's body in response to movement of the controls to furnish the appropriate sensation associated with flight maneuvers resulting from such control movement.

References Cited by the Examiner

UNITED STATES PATENTS

| | | | |
|---|---|---|---|
| 679,680 | 7/1901 | Langer | 5—350 |
| 2,057,687 | 10/1936 | Manson | 5—349 X |
| 2,136,510 | 11/1938 | Jensen | 5—349 X |
| 2,450,699 | 10/1948 | Veach | 5—350 |
| 2,687,580 | 8/1954 | Dehmel | 35—12 |
| 2,753,573 | 7/1956 | Barker | 5—349 |
| 3,017,642 | 1/1962 | Rosenberg | 5—349 |
| 3,097,436 | 7/1963 | Gaucher | 35—12 |

EUGENE R. CAPOZIO, *Primary Examiner.*

LAWRENCE CHARLES, JEROME SCHNALL,
*Examiners.*

SHELDON M. BENDER, *Assistant Examiner.*